(12) United States Patent
Caverly et al.

(10) Patent No.: US 9,751,553 B2
(45) Date of Patent: Sep. 5, 2017

(54) POWER RAKE AND TELESCOPE DYNAMIC TRAVEL LIMITS

(71) Applicant: STEERING SOLUTIONS IP HOLDING CORPORATION, Saginaw, MI (US)

(72) Inventors: Jacob A. Caverly, Freeland, MI (US); Gerald M. McCann, Bay City, MI (US)

(73) Assignee: STEERING SOLUTIONS IP HOLDING CORPORATION, Naw, MI (US)

(*) Notice: Subject to any disclaimer, the term of this patent is extended or adjusted under 35 U.S.C. 154(b) by 85 days.

(21) Appl. No.: 14/553,300

(22) Filed: Nov. 25, 2014

(65) Prior Publication Data

US 2015/0239488 A1 Aug. 27, 2015

Related U.S. Application Data

(60) Provisional application No. 61/943,731, filed on Feb. 24, 2014.

(51) Int. Cl.

| B60R 22/00 | (2006.01) |
| E05F 15/00 | (2015.01) |
| G05D 1/00 | (2006.01) |
| G05D 3/00 | (2006.01) |
| G06F 7/00 | (2006.01) |
| G06F 17/00 | (2006.01) |
| B62D 1/181 | (2006.01) |
| B62D 1/185 | (2006.01) |
| B62D 1/18 | (2006.01) |
| B62D 1/16 | (2006.01) |
| B62D 1/187 | (2006.01) |

(52) U.S. Cl.
CPC ............... *B62D 1/181* (2013.01); *B62D 1/16* (2013.01); *B62D 1/18* (2013.01); *B62D 1/185* (2013.01); *B62D 1/187* (2013.01)

(58) Field of Classification Search
None
See application file for complete search history.

(56) References Cited

U.S. PATENT DOCUMENTS

| 7,055,860 B2 | 6/2006 | Armstrong et al. |
| 7,331,608 B2 | 2/2008 | Armstrong et al. |
| 7,886,631 B2 | 2/2011 | Nashef et al. |
| 8,011,265 B2 | 9/2011 | Menjak et al. |
| 2013/0110353 A1* | 5/2013 | Tanaka ............... B62D 1/181 701/44 |
| 2013/0275010 A1* | 10/2013 | Kouchi ............... B62D 1/181 701/49 |
| 2013/0325264 A1* | 12/2013 | Alcazar ............... B62D 1/181 701/49 |

* cited by examiner

*Primary Examiner* — Lail Kleinman
(74) *Attorney, Agent, or Firm* — Cantor Colburn LLP

(57) ABSTRACT

In one exemplary embodiment of the present invention, a steering column assembly is provided. The assembly includes a mounting bracket, a steering column adjustable in a telescope direction and a rake direction, at least one actuator assembly configured to translate the steering column in the telescope direction and/or the rake direction, and a controller configured to drive the at least one actuator assembly to sequentially or simultaneously telescope and/or rake the steering column in a predefined geometric pattern.

16 Claims, 2 Drawing Sheets

POWER RAKE AND TELESCOPE DYNAMIC TRAVEL LIMITS

FIELD OF THE INVENTION

The following description relates to a steering column assembly, and in particular, a power steering column assembly with dynamic travel limits.

BACKGROUND

Some power adjustable steering columns may adjust in both a rake (tilt) direction and in a telescoping direction. Such adjustable steering columns commonly utilize a power actuator assembly to move the steering column in the rake direction and/or the telescope direction. These features cooperate to enable the driver to adjust the steering wheel to a desired, convenient position for operating the vehicle and for enabling the steering wheel to be moved out of the way to provide greater access to getting into and out of the driver's seat of the vehicle.

Typically, the power actuator assembly includes a toque transmission device, and a motor is mounted to the torque transmission device and extends along a motor axis. The motor includes an output shaft that is rotatable about the motor axis. A screw is rotatably supported by the torque transmission device and extends along a screw axis. The torque transmission device transfers the rotational movement of the output shaft about the motor axis to the screw, to rotate the screw about the screw axis.

However, positioning the steering column in the full up rake position and the full in telescope position may result in low hand clearance between, for example, the steering wheel and the instrument panel. Current technology alleviates this concern by truncating telescope travel and/or rake travel. This may result in a decreased total telescope travel or rake travel, respectively. Accordingly, it is desirable to provide a steering column that limits column travel in specific regions as functions of both telescope and rake position.

SUMMARY OF THE INVENTION

In one exemplary embodiment of the present invention, a steering column assembly is provided. The assembly includes a mounting bracket, a steering column adjustable in a telescope direction and a rake direction, at least one actuator assembly configured to translate the steering column in the telescope direction and/or the rake direction, and a controller configured to drive the at least one actuator assembly to sequentially or simultaneously telescope and/or rake the steering column in a predefined geometric pattern.

In another exemplary embodiment of the present invention, an electrically actuated steering column assembly is provided. The assembly includes a steering column movable in a telescope direction and a rake direction, and at least one actuator assembly operably associated with the steering column and configured to move the steering column in the telescope direction and the rake direction. A controller is configured to drive the at least one actuator assembly to telescope and/or rake the steering column. The controller is programmed to define at least one exclusion zone in the movement envelope of the steering column, and to automatically adjust movement of the steering column such that at least a portion of the steering column does not enter a boundary of the at least one exclusion zone.

In yet another exemplary embodiment of the present invention, a method of fabricating an electrically actuated steering column assembly is provided. The method includes providing a mounting bracket, providing a steering column movable in a telescope direction and a rake direction, and providing a controller configured to sequentially or simultaneously move the steering column in the telescope and/or rake directions in a predefined geometric pattern.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
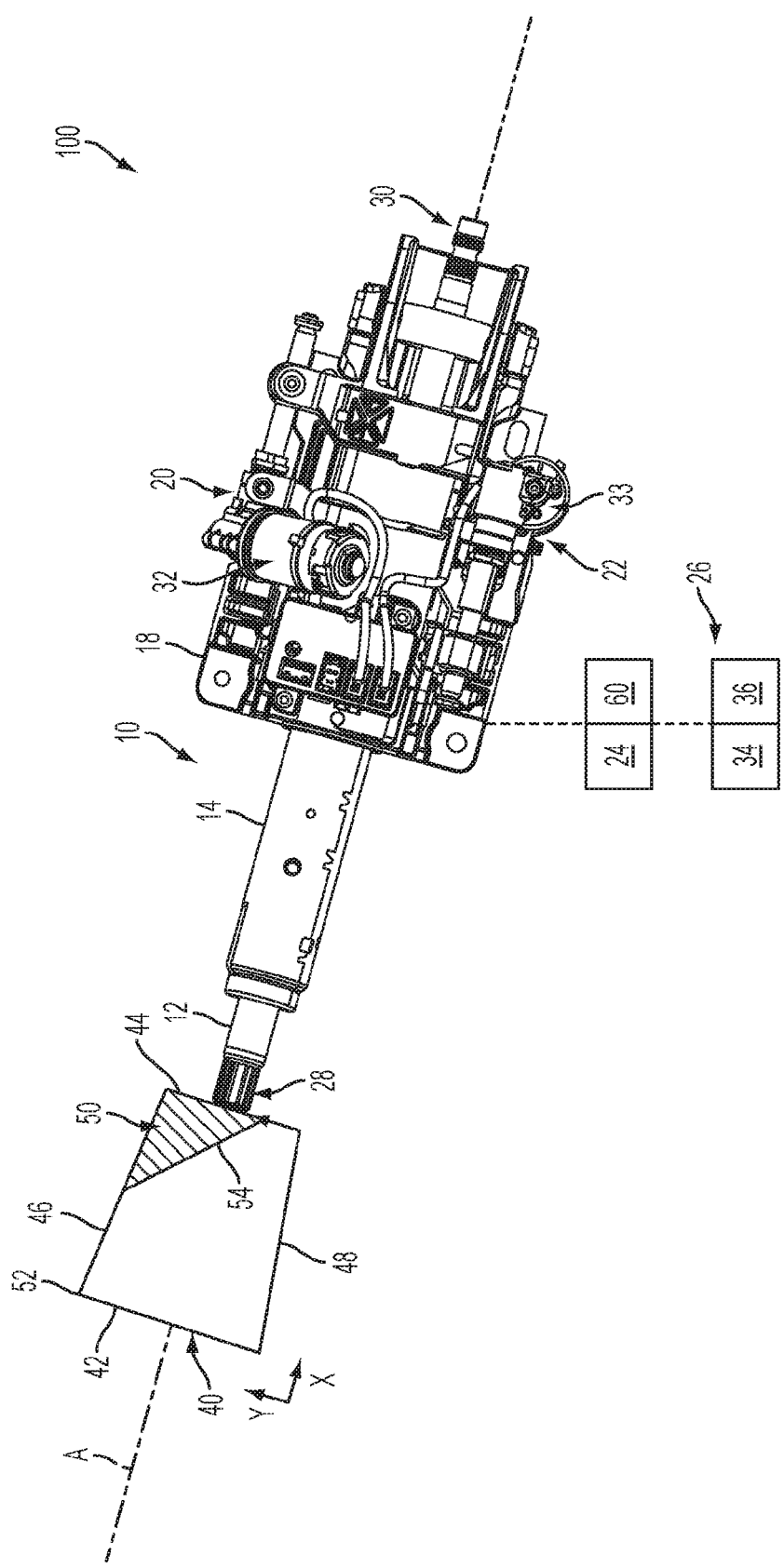
FIG. 1 is a view of an exemplary power adjustable steering column system.

Referring now to the Figures, where the invention will be described with reference to specific embodiments, without limiting same, FIG. 1 is a view of a power adjustable steering column system 100 according to an exemplary embodiment of the present invention. Power adjustable steering column system 100 generally includes a steering column assembly 10 having a steering column or shaft 12, a jacket assembly 14 positioned about shaft 12, a mounting bracket 18, a telescope actuator assembly 20, and a rake/tilt actuator assembly 22. In an exemplary embodiment, adjustable steering column assembly 10 is adjustable in a rake (tilt) direction and a telescope direction.

Adjustable steering column system 100 also includes an electrical control structure 24 and a switch 26 associated with steering column assembly 10. Electrical control structure 24 is configured to regulate the electrically actuated steering column assembly 10, and a driver activates switch 26 to direct electrical control structure 24 to apply a force to initiate movement of steering column assembly 10. The driver may then deactivate switch 26 to halt movement of steering column assembly 10. In one embodiment, switch 26 is positioned on a steering wheel (not shown). However, switch 26 may be positioned in any suitable location.

Steering shaft 12 extends along an axis 'A', and a steering wheel (not shown) is attached to an end 28 of shaft 12 while the other end 30 of shaft 12 is coupled to a steering gear (not shown). Jacket assembly 14 surrounds and supports shaft 12 via bearings (not shown) disposed between shaft 12 and jacket assembly 14. In an exemplary embodiment, jacket assembly 14 extends coaxially with steering shaft 12, which is rotatably connected to jacket assembly 14. Mounting bracket 18 supports jacket assembly 14 and mounts jacket assembly 14 to the vehicle (not shown).

Telescope actuator assembly 20 includes an electric motor 32 and gearing (not shown) for transferring the rotary motion of electric motor 32 to move shaft 12 in the telescope direction.

Rake actuator assembly 22 includes an electric motor 33 and gearing (not shown) for transferring the rotary motion of electric motor 33 to move shaft 12 in the rake direction. Although described as separate actuator assemblies 20, 22, a single actuator assembly (not shown) may be configured to move shaft 12 in both the telescope and rake directions.

In the exemplary embodiment, steering column assembly 10 may be moved in the telescope and/or rake directions. For example, as shown in FIG. 1, steering column assembly 10 includes a defined physical envelope 40 within which steering shaft end 28 (and thus the vehicle steering wheel) can move in the telescope direction 'x' along an axis and the rake direction 'y' along another axis that is disposed transverse to the axis. The physical envelope 40 includes a first physical boundary 42, a second physical boundary 44, a third physical boundary 46, and a fourth physical boundary 48. The second physical boundary 44 spaced apart from the first physical boundary 42 and each of the first physical boundary 42 and the second physical boundary 44 are disposed generally transverse to the axis and are disposed generally parallel to the another axis. The third physical boundary 46 is spaced apart from the fourth physical boundary 48. The third physical boundary 46 and the fourth physical boundary 48 each extend between the first physical boundary 42 and the second physical boundary 44 and are disposed generally transverse to the another axis and are disposed generally parallel to the axis. Although steering column assembly 10 may physically move throughout the entirety of physical envelope 40, there may be some areas of clearance concern. For example, an exclusion zone 50 may represent a positioning of the steering wheel that creates a low driver hand clearance between the steering wheel and the vehicle instrument panel. Accordingly, a controller 60 is provided to monitor the position of steering shaft 12 and ensure that any clearance boundaries are not violated. Alternatively, controller 60 may determine wheel position based on other operations. For example, controller 60 may monitor motor rotation, which is then mathematically correlated to a wheel position. As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

In the exemplary embodiment, controller 60 is programmed to define one or more exclusion zones (e.g., zone 50) within physical movement envelope 40, and controller 60 monitors the position of steering shaft 12 to prevent the steering wheel from violating the boundaries of and entering exclusion zone 50. Exclusion zone 50 may have any desired geometry and may constitute multiple areas.

In the event that steering column assembly 10 is commanded to move into a position that would create a clearance concern, controller 60 can force movement of another axis of motion to avoid the concern. This allows motion in the commanded direction to continue without cause for concern. For example, the steering wheel may be in the full extended, full upward tilt position, as represented by point 52. If shaft 12 is telescoped inward, the steering wheel will eventually encounter outer boundary 54 of exclusion zone 50 that is nested within the physical movement envelope 40. The boundary 54 extends from the third physical boundary 46 towards and is spaced apart from the fourth physical boundary 48. The boundary 54 extends to the second physical boundary 44. At this point, controller 60 may either automatically stop movement of steering column assembly 10 or automatically cause shaft 12 to move in the downward rake direction to follow boundary 54 until the steering wheel reaches the desired telescope position. As such, during movement of shaft 12, controller 60 is configured to move shaft 12 in the telescope direction as a function of rake position, and to move shaft 12 in the rake direction as a function of telescope position.

Further, when predefined positions or stored positions of steering column assembly 10 are activated, controller 60 calculates the best movement path of shaft 12 to the targeted position while avoiding exclusion zone(s) 50. As such, controller 60 parametrizes movement of steering column assembly 10 by defining exclusion zone(s) 50 in movement envelope 40.

In operation, as switch 26 is engaged by a driver, electrically actuated steering column assembly 10 allows movement of steering shaft 12 relative to the driver. Electrical control structure 24, which may include controller 60, regulates electrically actuated steering column assembly 10 to initiate and halt movement of steering shaft 12 in the desired direction while preventing violation of exclusion zone 50. For example, switch 26 may include a telescope switch 34 and a rake switch 36. Actuation of telescope switch 34 moves steering shaft 12 in the telescope out and telescope in directions (i.e., the x-direction). Actuation of rake switch 36 moves steering shaft 12 in the rake up and rake down directions (i.e., the y-direction). The driver may manipulate switches 34, 36 to move the steering wheel to a desired position. However, controller 60 is configured to automatically adjust movement of steering shaft 12 in the telescope and/or rake directions such that at least a portion of shaft 12 (e.g., steering wheel end 28) avoids exclusion zone(s) 50.

System 100 allows steering column assembly 10 or the steering wheel to avoid obstacles in a vehicle in which the invention is installed. In addition, controller 60 is programmed to only move column assembly 10 within predefined or predetermined geometric patterns or areas, thus avoiding clearance concerns, e.g. area 50. In one example, controller 60 is programmed for previously programmed occupant position preferences and/or for ingress/egress functions, and controller 60 moves the column/handwheel to the destination (driver position) either sequentially or simultaneously, while avoiding restricted area(s) 50 that will cause clearance concerns.

System 100 is unlike current production implemented control logic, which only allows for limitation of an axis bound for an entire column travel of the axis. As an example of a current system, a column may have +/−5 degrees of available rake travel, and +/−25 mm of available telescope travel. If there is a clearance concern when the column is fully raked up and 10 mm from telescope hard stop-in, then the clearance concern would have to be avoided by limiting the upward rake travel to 2 degrees for the entire telescope travel, even though 40 mm of telescope travel could accept 5 degrees of upward rake travel. In contrast, controller 60 is programmed to move motor 32 and column assembly 10 only outside those clearance concern limits. As such, controller 60 utilizes an equation and/or algorithms representing the travel boundaries instead of square boundaries. Thus, the control logic of controller 60 gains back the travel that would otherwise have been lost if column assembly 10 travel was truncated along its axis.

Figure 2:
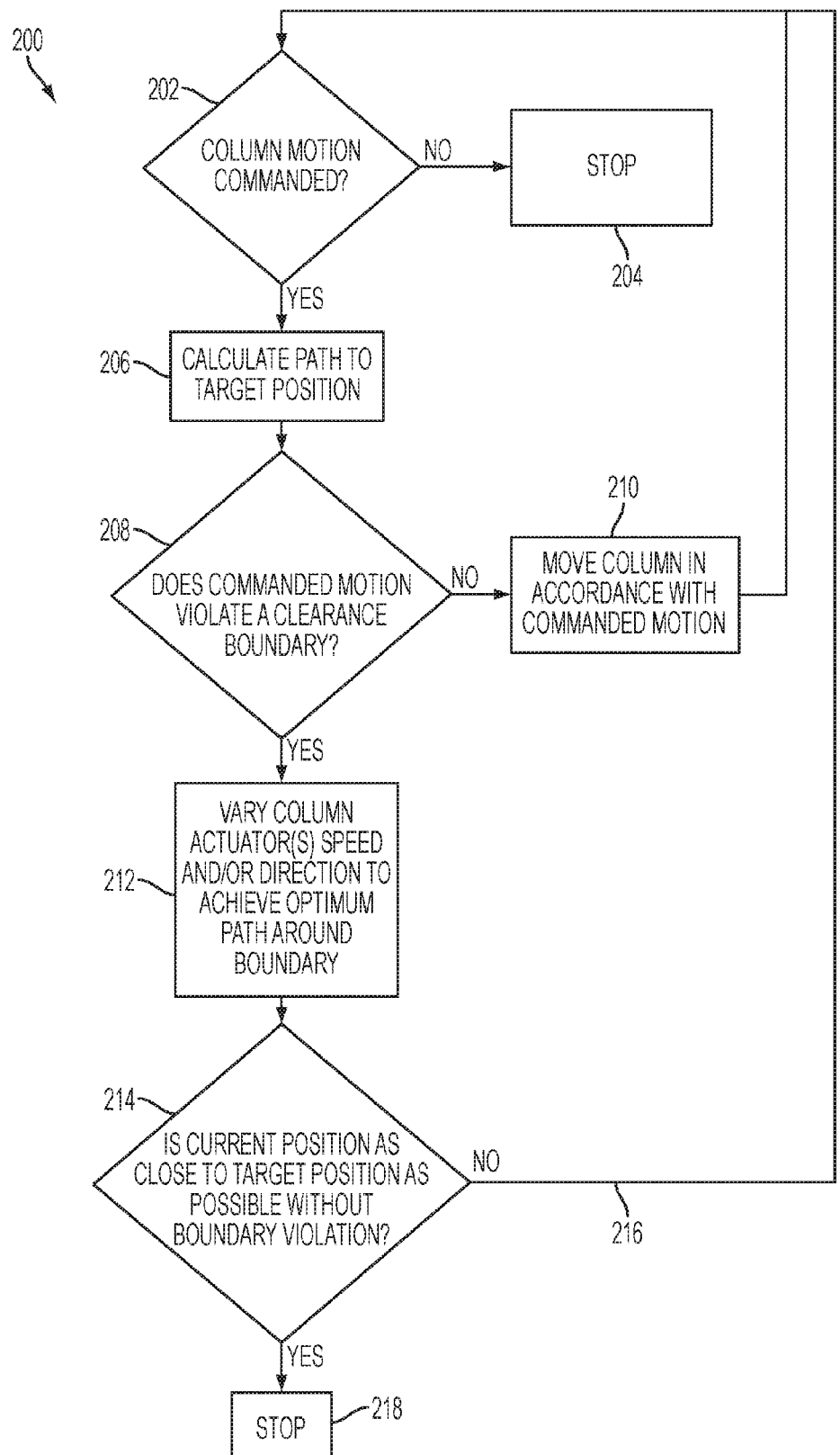
FIG. 2 is a flow diagram of an exemplary method of operation of the system shown in FIG. 1.

FIG. 2 illustrates an exemplary control sequence 200 of power adjustable steering column system 100 once exclusion zone(s) 50 have been programmed or defined in controller 60. At step 202, controller 60 determines if column motion is commanded, for example, by a driver actuating switch 26. At step 204, if column motion is not commanded, controller 60 stops movement of column assembly 10. At step 206, if column motion is commanded, controller 60 calculates a path to the target position.

At step 208, controller 60 determines if the commanded column motion violates a clearance boundary 50. At step 210, if the commanded motion does not violate clearance boundary 50, controller 60 moves column assembly 10 in accordance with the commanded motion and returns to step 202. At step 212, if the commanded motion violates a clearance boundary, controller 60 varies column actuator(s) speed and/or direction to achieve an optimum path around boundary 50. At step 214, controller 60 determines if the current position of column assembly 10 is as close to the target position as possible without boundary violations. At step 216, if the column position is not as close as possible, operation returns to step 202. At step 218, if the column position is as close as possible to the target position, controller 60 stops movement of column assembly 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
   a mounting bracket;
   a steering column adjustable in a telescope direction and a rake direction;
   at least one actuator assembly configured to translate the steering column in at least one of the telescope direction and the rake direction; and
   a controller configured to drive the at least one actuator assembly to move the steering column within a physical movement envelope having an exclusion zone nested within the physical movement envelope, the exclusion zone having a boundary disposed within and spaced apart from the physical movement envelope.

2. The assembly of claim 1, wherein the controller being pre-configured to prevent movement of at least a portion of the steering column into the exclusion zone.

3. The assembly of claim 2, wherein the controller is configured to move at least a portion of the steering column to follow the boundary of the exclusion zone when the portion of the steering column encounters the exclusion zone.

4. The assembly of claim 2, wherein the controller parametrizes the envelope zone to define the at least one exclusion zone.

5. The assembly of claim 2, wherein the controller is programmed, during movement of the steering column to a predefined position, to automatically adjust movement of the steering column in the telescope direction and/or the rake direction to avoid the exclusion zone.

6. The assembly of claim 1, wherein the controller is configured to move the steering column in the telescope direction as a function of rake position.

7. The assembly of claim 1, wherein the controller is configured to move the steering column in the rake direction as a function of telescope position.

8. The assembly of claim 1, further comprising a switch operably associated with the steering column assembly, the controller configured to move the steering column in a desired direction when a switch is actuated.

9. The assembly of claim 8, wherein the switch comprises a telescope switch, the controller configured to move the steering column in the telescope direction when the telescope switch is activated.

10. The assembly of claim 7, wherein the switch comprises a rake switch, the controller configured to move the steering column in the rake direction when the rake switch is activated.

11. An electrically actuated steering column assembly comprising:
    a steering column movable in a telescope direction along an axis and a rake direction along another axis disposed transverse to the axis within a physical movement envelope having a first physical boundary, a second physical boundary spaced apart from the first physical boundary, the first physical boundary and the second physical boundary are each disposed transverse to the axis, and a third physical boundary and a fourth physical boundary, the third physical boundary and the fourth physical boundary each extending between the first physical boundary and the second physical boundary and are each disposed generally transverse to the another axis;
    at least one actuator assembly operably associated with the steering column and configured to move the steering column in the telescope direction and the rake direction;
    a controller configured to drive the at least one actuator assembly to move the steering column in at least one of the telescope direction and the rake direction, the controller programmed to define an exclusion zone disposed within the physical movement envelope of the steering column, and to automatically adjust movement of the steering column such that no portion of the steering column enters a boundary of the exclusion zone that extends from the third physical boundary towards the fourth physical boundary.

12. A method of controlling a power adjustable steering column system having a steering column, the method comprising:
    determining if motion of the steering column is commanded;
    calculating a path to a target steering column position if motion of the steering column is commanded;
    determining if the commanded steering column motion violates a clearance boundary completely nested within a physical movement envelope;
    varying at least one of a speed and a direction of the steering column motion to avoid the clearance boundary if the commanded steering column motion violates the clearance boundary; and
    determining if a position of the steering column is proximate the target position without violating the clearance boundary.

13. The method of claim 12, wherein the clearance boundary defines edges of an exclusion zone within the physical movement envelope.

14. The method of claim 13, further comprising moving the steering column to follow the clearance boundary of the exclusion zone.

15. The electrically actuated steering column assembly of claim 11, wherein the boundary of the exclusion zone extends to the second physical boundary.

16. The electrically actuated steering column assembly of claim 11, wherein the boundary of the exclusion zone extends towards and is spaced apart from the fourth boundary.

* * * * *